Dec. 22, 1970   G. W. HELMER   3,548,450
CLAM OPENER DEVICE

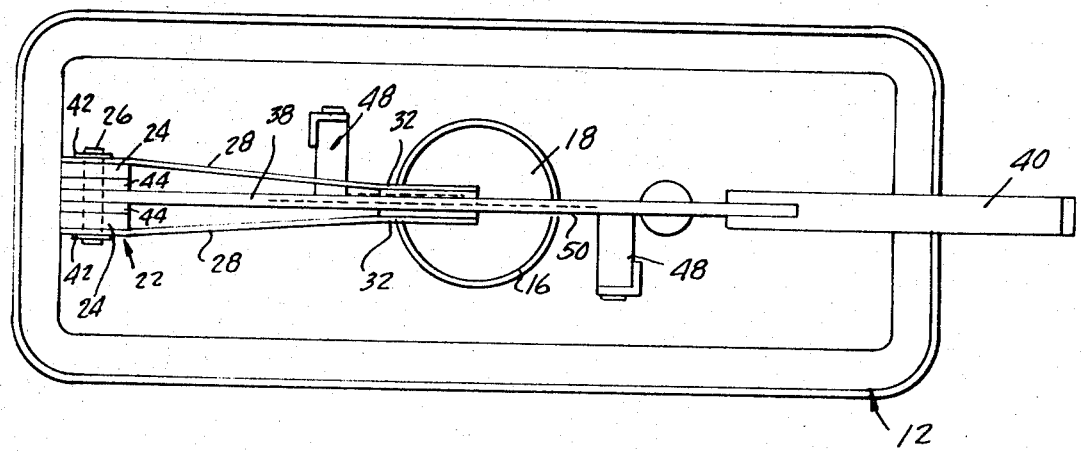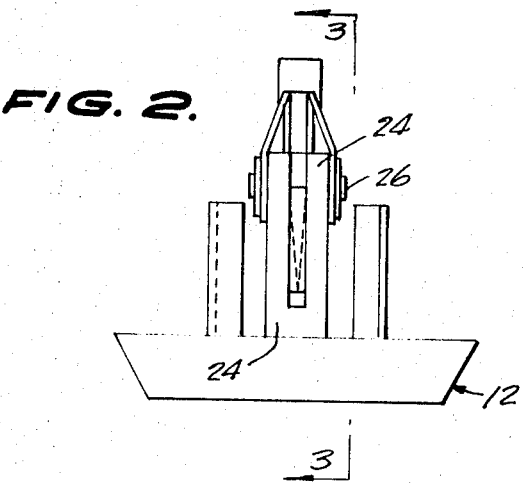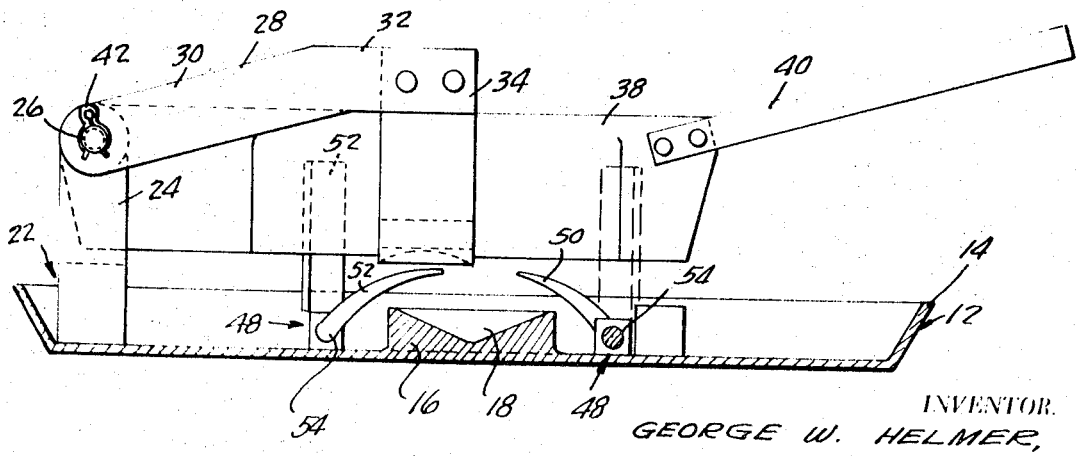

Filed Aug. 23, 1968   2 Sheets-Sheet 2

INVENTOR.
GEORGE W. HELMER,
BY
Berman, Davidson & Berman
ATTORNEYS.

United States Patent Office 3,548,450
Patented Dec. 22, 1970

3,548,450
CLAM OPENER DEVICE
George W. Helmer, R.F.D. 2,
West Winfield, N.Y. 13491
Filed Aug. 23, 1968, Ser. No. 754,766
Int. Cl. A22c 29/00
U.S. Cl. 17—76
2 Claims

ABSTRACT OF THE DISCLOSURE

A clam opener device comprising a lower clam support member and upper clam support members and an upper clam blade and a pair of lower clam blades for properly holding a clam in a rigid position so that the blades can properly open the clam and particularly the adductor muscles.

The present invention relates to a clam opener and the like and more particularly, to one for opening clams without mutilating them or losing the juice of the clam.

Another object of the present invention is to provide a clam opener which has clam clamping means for holding the clam when it is being opened.

Yet another object of the present invention is to provide a clam opening device having a plurality of blades for cutting the adductor muscles disposed on opposite sides of the clam and a blade means for opening the upper portion of the clam and clamping means for maintaining the clam in a predetermined position while the blade means are actuated.

Yet another object of the present invention is to provide a clam opening device having a plurality of upper clamping means and a lower locator means for disposing the clam in an upright position so that it can be opened by lower blade means and an upper blade means.

A still further object of the present invention is to provide a clam opening device that can be quickly and easily dismantled so that it may be properly cleaned as required.

Still yet another object of the present invention is to provide a rigid, yet simple, clam opening device that can be easily and quickly and easily manufactured at a minimum cost.

Various other objects and advantages of the present invention will be readily apparent from the following detailed description when considered in connection with the accompanying drawings forming a part thereof, and in which:

FIG. 1 is a top plan view of the clam opening device of the present invention;

FIG. 2 is an end view of the clam opening device shown in FIG. 1;

FIG. 3 is a side elevational view of the clam opening device embodied in the present invention, with portions in section for a better illustration of the invention;

Figure 4:
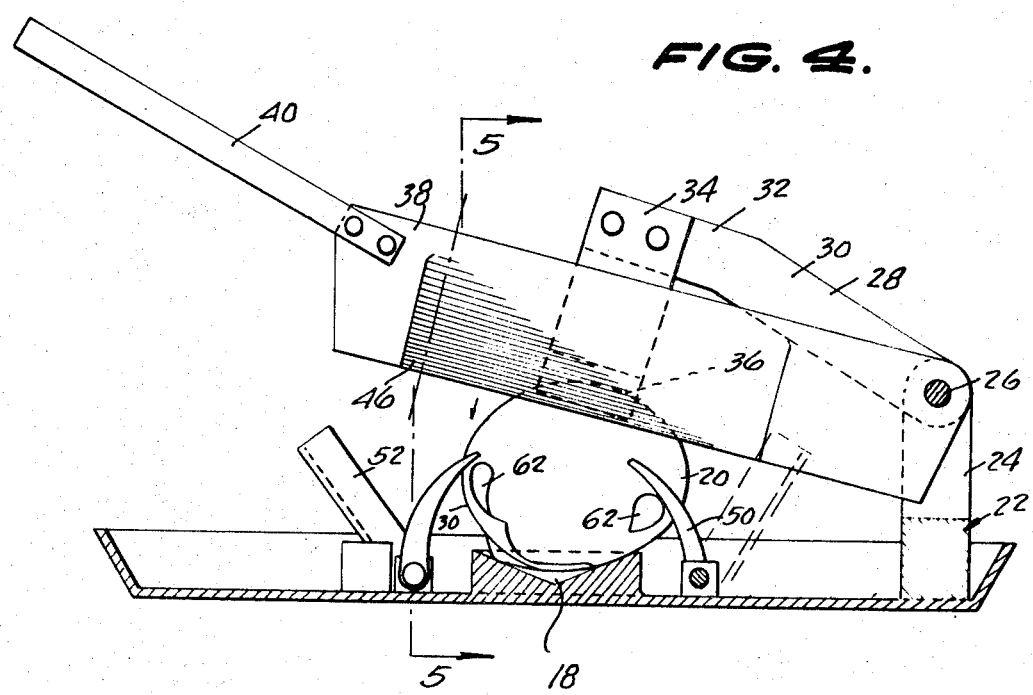
FIG. 4 is a view similar to FIG. 3, except that it illustrates a clam disposed in the clamping means and with the lower blade means shown in an operable position so as to cut the adductor muscles of the clam.

Referring to the drawings, the reference numeral 10 generally designates a clam opening device provided with a base 12 having outwardly tapered walls 14 so as to form a pan or a container for the juices of the clam. Disposed centrally of the base 12 is an upright clam support 16 which support is cylindrical or circular in plan and is further provided with a concave recess 18 therein for receiving the lower portion of a clam 20, and for locating the lower portion of the clam in the base. The base 12 is substantially rectangular, as best seen in FIG. 1, and an upright support 22 is provided in one end thereof. The upright support 22 is provided with two spaced apart vertical members 24, through which extends a substantially horizontal pivotal pin 26.

Figure 5:
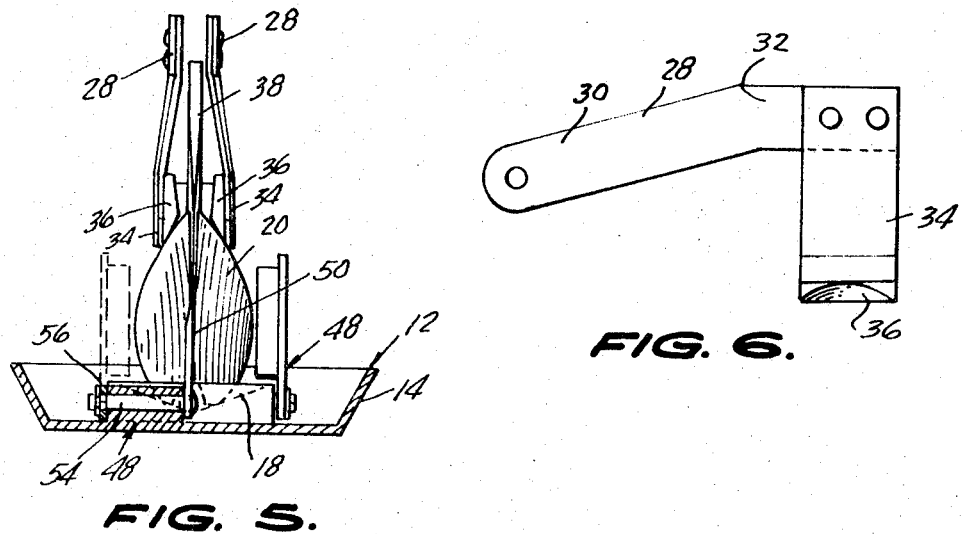
FIG. 5 is a section taken along the lines 5—5 of FIG. 4.
Figure 6:
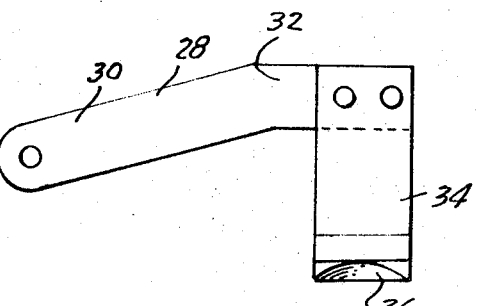
FIG. 6 is a detail view illustrating one of the clamping members embodied in the device.

The pin 26 has disposed thereon a pair of spaced finger clamping members 28, which have an upper inclined section 30 and a substantially horizontally extending section 32. The inner ends of the spaced clamping members 28 are provided with depending vertical members 34. Referring to FIG. 1, it will be noted that the two finger clamping members 28 are disposed in a position so that they converge in a progressive manner from their outer ends adjacent the pin 26 to their inner ends adjacent the sections 32, so that the vertical members 34 are in a resilient abutting engagement. The inner depending portions 34 of the clamping member can be forced apart and a clam 20 can be disposed therebetween so that the clam is firmly held in position. The lower ends of the depending members 34 are further provided with inwardly extending sections 36, as best seen in FIG. 5, which form a V configuration, so that the upper end of a clam 20 can be held or clamped therebetween.

Referring to FIGS. 1 and 4, a blade 38 is pivotally connected to the pin 26 and is provided with a handle 40 on its opposite end. The blade 38 extends between the two finger clamping members 28 and beyond the opposite end of the base 12, as best seen in FIG. 1. The finger clamping members 28 are of a construction so that they can slide down over the blade 38 after a clam 20 is placed in the lower clam support 16 and before the blade 38 is brought into operation. Once the clam is placed over the lower locating position in the clam support 16 and the upper locators, namely, the depending members 34, have been brought to bear against the upper surface of the clam 20, all that is necessary is to pull down on the handle 40 so that the blade 36 will move downwardly into the upper end of the clam as it is automatically aligned with the crevice of the clam, since the members 34 pick up the edge of the clam with their angular contact surfaces.

The finger clamping members and the blade 38 can be easily disassembled for cleaning purposes since the pin 26 is provided with two snap washers 42 on opposite sides or ends of the pin, which can be easily removed from the pin, so that the pin 26 can be slipped out of the vertical members 24. Washers 44 may be provided on the pin 26 on opposite sides of the blade 38 so as to properly maintain the blade in its position with respect to the vertical members 24.

The opposite sides of the blade 38 may be tapered as indicated at 46 so that the blade is sharpened at an angle on each side to allow for ease of operation and to allow for the blade not to separate the halves of the clam too quickly.

Disposed within the base 12 are two lower blade assemblies 48. The blade assemblies 48, as best seen in FIG. 1, are disposed on opposite sides of the clam support 16 and also on opposite sides of the base 12. Each assembly 48 is provided with a pointed arcuate cutter blade 50, and a handle 52 disposed on a horizontal pin 54 that is provided with snap washers 56 for securing the pin 54 within a block or support member 60. The operating handle 52 is located where it can be pushed downwardly without interfering with the other operational parts of the clam opening device. The removal of the washers 56 permits the pin 54 and the blades 50 to be removed for cleaning, if necessary. It will be noted that the lower blades 50 are positioned so as to cut through the adductor muscles 62 disposed on the opposite sides of the clam 20, as best seen in FIG. 4.

All of the parts of the clam opening device are made from non-corrosive material so that there is a minimum of upkeep with respect to the device.

Thus, from the foregoing description, it is apparent that the foregoing invention provides a novel clam opener device with finger clamping means which can readily maintain the upper end of a clam therebetween, and with lower support means for the clam, so that the clam is properly positioned, and with a blade that can move downwardly between the upper clam holding members so as to properly open the clam.

The present invention further provides a lower pair of blades for cutting the adductor muscles of the clam, which are disposed on opposite sides of the clam.

Inasmuch as various changes may be made in the form, location and relative arrangement of the several parts without departing from the essential characteristics of the invention, it will be understood that the invention is not to be limited except by the scope of the appended claims.

What is claimed is:

1. A device for opening shell fish comprising base means, central lower support means in said base for supporting a shell fish to be opened, vertical support means disposed adjacent one end of base, finger clamping means pivotally connected to said vertical support means and swingable over said central support means to hold a shell fish therebetween, and blade means positioned on said device for cutting into the crevice of a shell fish held by said finger clamping means and said central lower support means, said blade means including an upper blade pivotally connected to said vertical support means and swingable downwardly between said finger clamping means, said blade means also including a pair of lower members each consisting of an arcuate pointed blade and a handle for actuating its respective blade, said members being pivotally connected to said base means on opposite sides of said central support means, said blades being swingable into opposite sides of the crevice of a shell fish held in said central lower support means.

2. The device of claim 1 wherein said lower members are pivoted on pins and snap washers are provided to secure said lower members to said base means.

References Cited

UNITED STATES PATENTS

| | | | |
|---|---|---|---|
| 1,041,198 | 10/1912 | Tiffany | 17—76 |
| 1,465,799 | 8/1923 | Aszkler | 17—76 |
| 2,808,613 | 10/1957 | Palmere | 17—76 |

LUCIE H. LAUDENSLAGER, Primary Examiner